May 25, 1965  E. S. WIESZECK  3,185,053
CAMERA LIGHT CONTROL MECHANISM
Filed Sept. 5, 1962
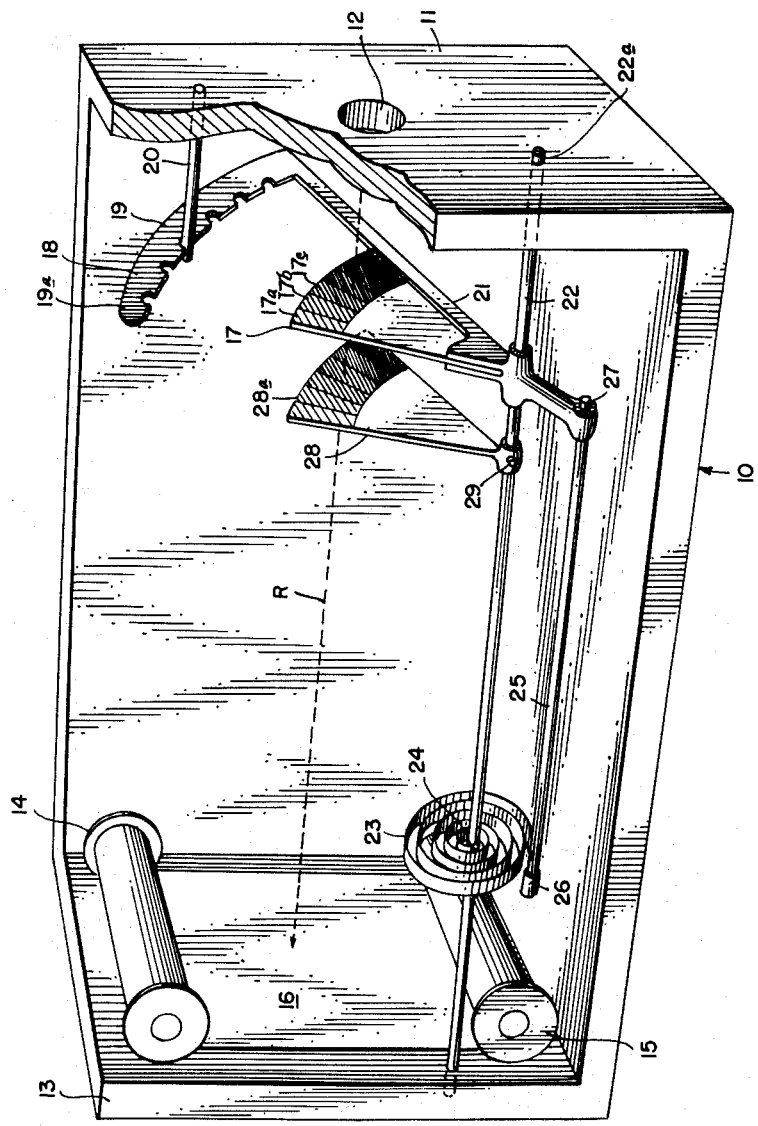
INVENTOR:
EMIL S. WIESZECK
BY
Dawson, Tilton, Fallon, Lungmus & Alexander
ATT'YS 3,185,053
CAMERA LIGHT CONTROL MECHANISM
Emil S. Wieszeck, Box 175, Salem, N.H.
Filed Sept. 5, 1962, Ser. No. 221,551
11 Claims. (Cl. 95—10)

This invention relates to a camera light control mechanism, and, more particularly, to a control mechanism for development type cameras.

The invention finds utility in connection with cameras which are capable of having the exposed film developed while the film is still within the camera casing. As such, there is a problem of developing the film to yield the proper light intensity in the various images. More especially, the problem resides in negating the effects of changes in temperature to achieve predetermined, constant development times.

It is, therefore, an object of this invention to provide a novel mechanism for compensating for temperature effects in development type cameras particularly.

Another object is to provide a mechanism which automatically changes the light intensity directed against the film as a function of the temperature under which the camera is operated.

Other objects and advantages of this invention may be seen in the details of construction and operation set down in this specification.

The invention will be explained in conjunction with the accompanying drawing, which is a schematic representation of a development type camera in perspective view and partially broken away to show the operative elements of the invention.

In the illustration given, the numeral 10 designates generally a casing or housing for a camera, and is seen to be relatively elongated for the purpose of clearly illustrating the invention. The casing 10 is equipped with the usual front wall 11 equipped with an aperture 12 for the receipt of a lens (not shown). The lens to be used in the inventive system may be designed for optimum speed and size without having to take into consideration complexities in design arising from the use of an iris to limit the light reaching the film.

The casing 10 is also equipped with a rear wall 13 which provides a mounting for spools or reels 14 and 15. One spool acts as an unwind spool, while the other serves to wind the film which is designated 16.

Although an iris may be used to control the aperture opening for light rays passing through the lens opening 12 and ultimately impinging upon the film 16, I find it advantageous to employ a sector or quadrant 17 which conveniently can be constructed of plastic material substantially insensitive to temperature changes. Alternatively, glass sectors may be employed at 17, since these are also dimensionally stable to temperature changes.

The sector 17 is seen to be equipped with portions 17a, 17b, 17c, etc., of graduated density (color or neutral), and these are mounted for movement into selective register with the light ray R passing through the lens opening 12 and impinging upon the film 16. For this purpose, the sector 17 is mounted on a bracket 18. The bracket 18 is essentially L-shaped and one arm portion 19 is provided externally of the housing 10. The arm portion 19 is seen to be equipped with notches 19a which may be engaged by a rod 20 supported on the housing 10. The bracket 18 is equipped with a second arm portion 21 which is pivotally mounted on a shaft 22, the shaft 22 being rotatably supported within the housing 10 as at 22a. Thus, movement of the arm 19 positions a segment of given shading in register with the light ray R. It will be appreciated that this operation corresponds to that achieved through changing the leaf setting of the usual iris to achieve a different $f$ setting, and may be accomplished automatically in response to a light-sensitive mechanism, or manually. With every iris change ($f$ stop), a different center portion of the lens is used, varying the quality of the image transmitted. No such problem exists with my system, since I do not restrict the ability of the lens to function in any way. Also, the iris construction usually consists of several leaves intimately intermeshed that increase or decrease the aperture opening at the center of the iris, resulting in openings that are not of geometric regularity. This problem does not apply with the instant invention, since the one-piece sector in each instance presents some constant geometric configuration, plane or lenticular in nature.

The compensating mechanism for thermal changes will now be described, and in this connection it will be seen that a coiled bimetallic element 23 is connected to the shaft 22 as at 24. The shaft 22 is free to rotate within the housing 10 and is caused to rotate under the urging of the coiled bimetallic element 23. For this purpose, the outer end of the bimetallic element 23 is connected to a second shaft 25 as at 26. The shaft 25 is also rigidly coupled to the bracket 18 as at 27.

Completing the structure is a second sector 28 which is fixed to the shaft 22 as at 29. The sector 28 is equipped with a zone 28a of gradually increasing opacity or density in contrast to the step increments of density 17a, 17b, etc., provided in the sector 17.

In operation, the bimetal or polymetal element 23, as the case may be, moves the sector 28 to one side or the other, depending on the temperature change, thus interposing greater or less opacity to the light ray R, reducing or increasing the intensity of the light forming the photographic image on the negative to be processed with its positive or by itself, and achieving constant developing time in spite of temperature variations.

A constant datum level is achieved through the interconnection of the bimetallic element 23 with the bracket 18 so that with a given setting of the arm portion 19, under isothermal conditions, the sector 28 follows positively and faithfully the rotational movement of the sector 17.

It will be appreciated that the instant invention is applicable to a camera using a conventional shutter and iris as the means for inhibiting light rays passing through the housing to impinge upon the film 16. In such case, it is recognized that shutters slow down in cold weather, and once a characteristic curve is determined for a particular shutter design, the bimetal 23 can be designed to include an additional corrective motion.

In any event, it is possible to regulate the second inhibition means, i.e., the sector 28, independently of the first sector 17, but also in correspondence to the degree of illumination of the object being photographed.

In certain instances, it may be advantageous to provide manual control of the second sector 28 as by providing a hand wheel or suitable dial accessible from the exterior of the housing 10.

While in the foregoing specification a detailed description of the invention has been set down for the purpose of explanation thereof, many variations in the details herein given may be made by those skilled in the art without departing from the spirit and scope of the invention.

I claim:
1. For a film development camera having a casing equipped with lens means and means for supporting film spaced from said lens means, an image light control mechanism comprising:
(A) first light inhibition means in said casing interposed in the path of light rays passing through said lens means to said film,
(B) means for positioning said first light inhibition means as a function of the light intensity external of said casing, (C) second light inhibition means in said casing interposed in said light path, and (D) means connected to said second light inhibition means for movement thereof, said connected means including thermally responsive means whereby said second light inhibition means is positionable independently of said first light inhibition means to compensate for temperature changes within said casing, both of said light inhibition means having variable light transmissive capabilities.

2. The structure of claim 1 in which said second light inhibition means includes a filter having progressive opacity in the direction of positionable movement thereof.

3. The structure of claim 3 in which said first light inhibition means includes a filter having an incremental increased opacity in the direction of positioning movement thereof.

4. For a film development camera having a casing equipped with lens means and means for supporting film spaced from said lens means, an image light control mechanism comprising:

(A) first light inhibition means in said casing interposed in the path of light rays passing through said lens means to said film, (B) means for positioning said first light inhibition means as a function of the light intensity external of said casing, (C) second light inhibition means in said casing interposed in said light path, and (D) means interconnecting said first and second light inhibition means for cooperative movement thereof, said interconnecting means including thermally responsive means whereby said second light inhibition means is positionable independently of said first light inhibition means to compensate for temperature changes within said casing, both of said light inhibition means having variable light transmissive capabilities.

5. The structure of claim 4 in which said second light inhibition means includes a filter having progressive opacity in the direction of positionable movement thereof.

6. The structure of claim 5 in which said first light inhibition means includes a filter having an incremental increased opacity in the direction of positioning movement thereof.

7. For a film development camera havng a casing equipped with lens means and means for supporting film spaced from said lens means, an image light control mechanism comprising:

(A) first light inhibition means in said casing interposed in the path of light rays passing through said lens means to said film, (B) means for positioning said first light inhibition means as a function of the light intensity external of said casing, (C) second light inhibition means in said casing interposed in said light path, and (D) a bimetallic, thermally sensitive element coupled between said first and second light inhibition means, and means restricting movement of said first light inhibition means in response to change in shape of said element whereby said second light inhibition means is positionable in response to thermal changes in said casing, both of said light inhibition means having variable light transmissive capabilities.

8. The structure of claim 7 in which said second light inhibition means is fixed to a shaft, said shaft being mounted for free rotation in said casing, said element being coupled to said shaft.

9. The structure of claim 8 in which a second shaft is provided in said casing, said element and said first light inhibition means being coupled to said shaft.

10. For a film development camera having a casing equipped with lens means and means for supporting film spaced from said lens means, an image light control mechanism comprising:

(A) light inhibition means in said casing interposed in the path of light rays passing from said lens means to said film, (B) means for positioning said light inhibition means as a function of the light intensity external of said casing, (C) a filter quadrant in said casing interposed in said light path, and (D) means interconnecting said light inhibition means and said quadrant for cooperative movement thereof, said interconnecting means including thermally responsive means whereby said quadrant is positionable independently of said light inhibition means to compensate for temperature changes within said casing, said quadrant having progressive opacity along the direction of movement thereof, said light inhibition means also having progressive opacity along the direction of movement thereof whereby both said light inhibition means and filter quadrant have variable light transmissive capabilities.

11. For a film development camera having a casing equipped with lens means and means for supporting film spaced from said lens means, an image light control mechanism comprising:

(A) first light inhibition means in said casing interposed in the path of light rays passing through said lens means to said film, (B) means for positioning said first light inhibition means as a function of the light intensity external of said casing, (C) second light inhibition means in said casing interposed in said light path, and (D) means for positioning said second light inhibition means as a function of the temperature within said casing, both of said light inhibition means having variable light transmissive capabilities.

References Cited by the Examiner

UNITED STATES PATENTS

| | | | |
|---|---|---|---|
| 2,224,726 | 12/40 | Finnegan et al. | 95—64 |
| 2,664,038 | 12/53 | Canham | 95—14 |
| 3,010,359 | 11/61 | Koeber | 95—64 X |

FOREIGN PATENTS 821,605 10/59 Great Britain.

NORTON ANSHER, *Primary Examiner.*

EMIL G. ANDERSON, *Examiner.*